United States Patent [19]

Mesnel

[11] Patent Number: 4,843,763
[45] Date of Patent: Jul. 4, 1989

[54] WINDOW SEAL AND GUIDE FOR FLUSH MOUNTED WINDOWS

[75] Inventor: Francois Mesnel, Neuilly-sur-Seine, France

[73] Assignee: Establissements Mesnel, Carrieres-sur-Seine, France

[21] Appl. No.: 24,527

[22] Filed: Mar. 11, 1987

Related U.S. Application Data

[63] Continuation-in-part of Ser. No. 885,731, Jul. 21, 1986, which is a continuation of Ser. No. 612,178, May 21, 1984, abandoned.

[30] Foreign Application Priority Data

Mar. 19, 1986 [FR] France .............................. 86 03886

[51] Int. Cl.⁴ .......................... B05D 3/12; F06B 7/16; F16J 15/02; F16J 15/16
[52] U.S. Cl. ........................................ 49/440; 29/416; 49/491; 49/506; 156/244.19; 156/250; 277/166; 277/205; 277/208; 296/93; 427/289; 428/122
[58] Field of Search .................. 277/166, 184, 211, 1, 277/205, 208; 296/93; 428/122; 49/490, 491, 506, 440, 441, 496, 488; 156/108, 244.15, 244.12, 244.18, 244.19, 253, 268, 303.1, 293, 250; 29/469.5, 515, 428, 416; 427/289

[56] References Cited

U.S. PATENT DOCUMENTS

| | | | |
|---|---|---|---|
| 2,196,888 | 4/1940 | Bailey | 49/491 |
| 3,479,768 | 11/1969 | Smadja | 49/490 X |
| 3,638,359 | 2/1972 | Kruschwitz | 49/490 |
| 4,042,741 | 8/1977 | Bright | 49/490 X |
| 4,308,302 | 12/1981 | Etter et al. | 49/490 X |
| 4,472,469 | 9/1984 | Thies | 49/490 X |

FOREIGN PATENT DOCUMENTS

| | | | |
|---|---|---|---|
| 264563 | 8/1965 | Australia | 49/440 |
| 0164601 | 12/1985 | European Pat. Off. | |
| 3512973 | 11/1985 | Fed. Rep. of Germany | |
| 2168962 | 9/1973 | France | |
| 2564047 | 11/1985 | France | |
| 2140065 | 11/1984 | United Kingdom | 49/490 |

Primary Examiner—Allan N. Shoap
Attorney, Agent, or Firm—Foley & Lardner, Schwartz, Jeffery, Schwaab, Mack, Blumenthal & Evans

[57] ABSTRACT

The seal and guide includes two portions which are connected by an elastomeric hinge. One of the portions is a fixation member which attaches to the flange on the frame of an automobile. The other portion includes a guiding and sealing channel which receives a movable window. Due to the elastomeric hinge, the guiding and sealing channel is allowed to flex so as to compensate for irregularities in the shape of the door frame. In this manner, the window may be easily moved and properly sealed on a variety of door frames.

14 Claims, 1 Drawing Sheet

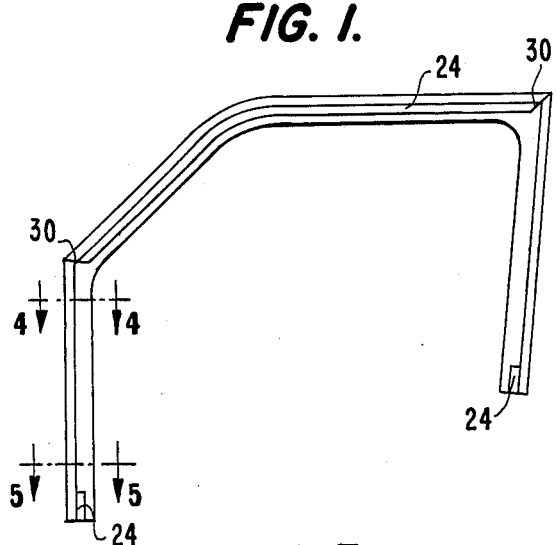
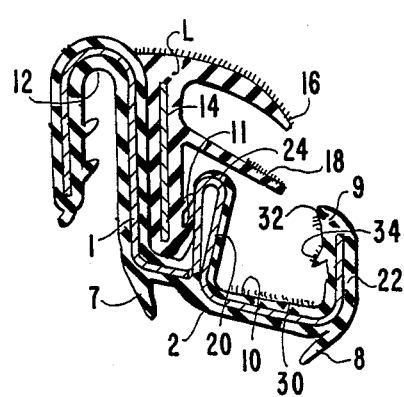
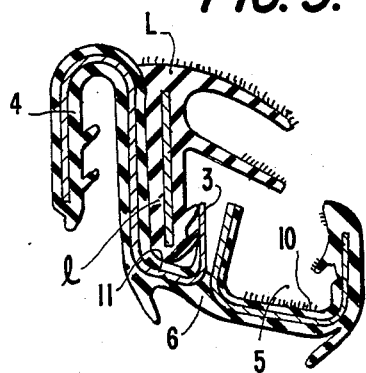
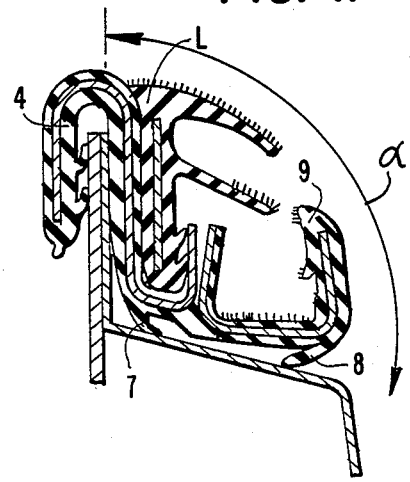
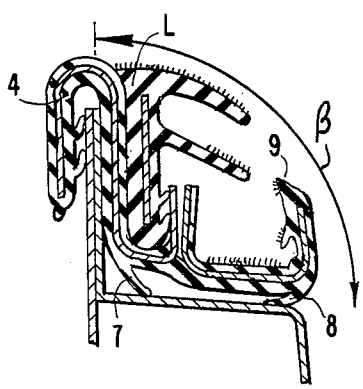
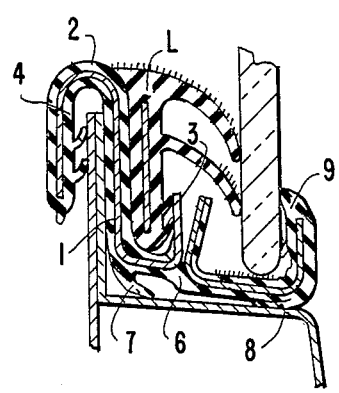

WINDOW SEAL AND GUIDE FOR FLUSH MOUNTED WINDOWS

CROSS REFERENCE TO RELATED APPLICATIONS

This is a continuation-in-part of U.S. application Ser. No. 885,731, filed July 21, 1986, which is in turn a continuation of U.S. application Ser. No. 612,178, filed May 21, 1984, now abandoned.

BACKGROUND OF THE INVENTION

This invention relates to window seals to seal and guide movable windows and especially for such seals which are designed to be used with flush mounted movable windows in an automobile.

Wind tunnel research has demonstrated that the coefficient of drag of an automobile is affected by the configuration of the vehicle body and in particular by the manner in which the body components are attached. This type of research has demonstrated the importance of maintaining the windows of a vehicle flush with the vehicle body. However, conventional seals have been found to be poor for use in maintaining the windows of an automobile flush, and at the same time maintaining an adequate seal around the windows.

My prior application Ser. No. 885,731 discloses an improved seal for use with flush mounted windows. The disclosure of this application is incorporated herein by reference.

Due to the large manufacturing tolerances associated with automotive body elements and in particular with car doors, the movement of the movable windows in the car doors can be difficult. This is caused by the fact that the car doors are manufactured by connecting sheet metal pieces together to form a flange which defines the window opening. This flange may not be perfectly true. When the improved seal disclosed in my aforementioned application 885,731 is mounted on the flange, the window channel follows the flange and is also not true. This results in the window binding and/or in an imperfect seal.

SUMMARY OF THE INVENTION

One object of the present invention is to provide a window seal which can be used in a flush mounted automobile window.

Another object of the present invention is to provide a window seal which aids in guiding as well as sealing a movable window.

A further object of the present invention is to provide a window seal which eliminates binding of the window during movement.

Another object of the present invention is to provide a window seal which produces a continuous seal against the movable window regardless of irregularities in the window opening.

In accordance with the above and other objects, the present invention comprises an element having a fixation profile and a guiding and sealing channel in which the fixation profile and the guiding and sealing channel are interconnected by an elastic articulation member which provides a supple bending between the fixation profile and the channel.

In accordance with other objects, the present invention comprises a method of producing the interconnected fixation profile and the guiding and sealing channel in an economic manner by bending a common metallic member, attaching an elastomer to the bent member and separating the member into two pieces connected by the elastomer.

BRIEF DESCRIPTION OF THE DRAWINGS

The above and other objects will become more readily apparent as the invention becomes more clearly understood in accordance with the detailed description to follow, reference being had to the accompanying drawings in which like parts are designated by like reference numerals, and in which:

FIG. 1 is an elevated schematic view of an upper portion of a car door containing a window seal and guide according to the present invention;

FIG. 2 is a cross sectional view of a rigidly connected fixation profile and guiding and sealing channel assembled with an auxiliary sealing profile called a "licker";

FIG. 3 is a cross sectional view similar to that of FIG. 2 with the fixation profile and the guiding and sealing channel separated by a broaching process prior to the insertion of the licker;

FIG. 4 is a cross sectional view taken along section line 4—4 of FIG. 1 and rotated 90 degrees, showing the device of the present invention after mounting on an upper part of a car door frame having a mounting angle alpha on the order of 105 degrees;

FIG. 5 is a cross sectional view taken along section line 5—5 of FIG. 1 and rotated 90 degrees, showing the device of the present invention after mounting on a lower part of a car door frame having a mounting angle beta on the order of 95 degrees; and FIG. 6 is a cross sectional view of the device of the present invention mounted on the frame of a car door and shows how the moving window is guided and sealed in the guiding and sealing channel.

DETAILED DESCRIPTION OF THE PREFERRED EMBODIMENTS

FIG. 1 shows a typical profile of the window opening in the frame of a car door. The present invention provides a sealing and guiding element which can be connected directly to the door frame for both sealing and guiding a movable window in a manner which is flush with the outer surface of the car body.

FIG. 2 shows a sealing and guiding element according to my prior application ser. no. 885,731. This element has a single continuous carrier 1 which is bent to form two U-shaped portions 10 and 11 facing in one direction and a third U-shaped portion 12 facing in the other direction. U-shaped portion 12 constitutes a fixation profile or fixation element which clamps onto the door frame and holds the entire unit in place. U-shaped portion 11 clamps onto an auxiliary sealing element L known as a licker. Licker 11 has a metal core 14 and two sealing lips 16 and 18 which extend toward the U-shaped portion 10. Metal core 14 is perforated in a known manner to make it flexible. This type of core is known as a "punched core." The U-shaped portion 10 has an inner wall 20 positioned under the lip 18 and an outer wall 22 which has a sealing lip 9. It will be noted that the U-shaped portions 10 and 11 are connected by a web 24 in the carrier 1 so that the entire structure is rigid.

The structure of FIG. 2 is formed by first taking a flat piece of metal and bending it in a known manner to form the cross sectional shape shown in FIG. 2 along the entire length of the metal. Preferably the metal used in this operation is aluminum. Relatively heavy gauge aluminum is used so that the carrier is relatively rigid. The metal is free of punched out sections or perforations, again so that the carrier is rigid. The metal used in this operation is coated with a bonding agent. That is to say the coating provides a bond between the aluminum strip and the rubber during the vulcanization. The straight carrier having the cross sectional shape shown in FIG. 2 is then subjected to an extrusion process in which elastomeric material 2 is extruded on the carrier to cover the entire carrier. The elastomer 2 is relatively thin and provides only a skin on the carrier. During the extrusion process, the various lips shown in FIG. 2 are formed and a connection is formed between the lower parts of the U-shaped portions 10 and 11. The bonding agent on the carrier attaches the elastomer to the carrier. Any known bonding material which provides a good metal to elastomer bond can be used. Flocking 30, 32 and 34 is then applied to the elastomer in a known manner using flocking adhesive and then the elastomer is finally cured. Sections are then cut form the final structure. Each cut section is long enough to accommodate the upper and lateral sides of one window opening.

The structure of FIG. 3 is produced in the same manner as that of FIG. 2 except that the web 24 is removed so as to separate the U-shaped portion 10, which forms a guiding and sealing channel 5, from the U-shaped portion 11. These separated U-shaped portions are still resiliently connected by a hinge 6 formed from the elastomer extending between the lower parts of the U-shaped portions.

As seen in FIG. 6, the glass pane occupies a position in the U-shaped portion 10 adjacent the outer wall 22. The outer wall 22 is connected to the inner wall 20 by a web and the glass pane is adjacent a glass sliding portion of this web which is near the outer wall 22 and defines the path of the window. The outer wall 22 is outside of this glass sliding portion and the hinge 6 is inside of this glass sliding portion.

A comparison of FIGS. 2 and 3 shows the same simple metal core 1, the same profile and also the same elastomeric material 2 bonded to the carrier, but, as discussed above, in FIG. 3, the carrier has been longitudinally broached to separate it into two pieces while maintaining a single profile due to the bonded elastomeric material which surrounds and holds the two carrier pieces together. This is the major distinction between the present invention and that of my aforementioned application ser. no. 885,731. In other words, after formation of the basic carrier 1 and after attachment of the elastomeric material 2 to the carrier 1, but before insertion of the licker L into the carrier 1, the carrier is separated into two parts by broaching the carrier longitudinally at the central region 3 to remove the web 24. In this manner, a relative independence is achieved between the fixing profile 4 on the body and the guiding and sealing channel 5 which is formed from the U-shaped portion 10. The independence between the fixing profile 4 and the guiding and sealing channel 5 is limited by the elastic hinge 6 which has sufficient flexibility to allow an increase of the opening angle on the order of 12 degrees as shown in FIG. 4 and to allow a decrease in the opening angle on the order of 4 degrees, as shown in FIG. 5. This variation will accommodate an opening angle of the door frame from a maximum, alpha, on the order of 105 degrees as shown in FIG. 4 to a minimum, beta, on the order of 95 degrees as shown in FIG. 5.

This ability to vary the opening angle reduces the strain exerted on moving glass in the channel 5 since the angle of the guiding and sealing channel 5 can vary to accommodate the window glass. The strain is further reduced by the effect of the lips 7, 8 and 9. Lips 7 and 8 form a weather seal against the door frame and are flexible to accommodate changes in angle of the guiding and sealing channel 5. Due to these lips, the channel 5 can be spaced from the door frame to allow sufficient space for flexing movement. Lip 9 is on the outer wall of the channel 5 and ensures a good weather seal against the window at a variety of angular positions of the channel 5. Accordingly, it can be seen that the present invention always produces a proper interaction of the outer wall of the guiding and sealing channel with the window glass to accommodate every diverse door frame structure and always ensures sealing against air and water and at the same time reduces the effort required for operating the movable window by compensating for any potential binding of the window due to irregularities in the door frame or because of vibrations of the entire unit transmitted through the door frame. This is all accomplished while at the same time maintaining a very thin outer wall in the channel 5 so as to greatly facilitate the production of a true "flush" mounted window which is necessary to reduce the coefficient of drag of the vehicle in air.

Referring again to FIG. 1 it can be seen that the web 24 is still present in certain portions of the structure. That is, where it is not necessary for the sealing and guiding channel to be flexible, the web 24 is retained to provide rigidity to the overall structure. In FIG. 1, the web 24 is retained at the very bottom of each side of the window channel and along the top of the window opening. The web 24 is removed only along the vertical lateral portions of the window track. Of course, the areas where the web 24 is to be removed may vary from application to application.

As discussed above, the structure of the present invention is formed by bending the carrier in the appropriate cross sectional shape and then covering it with elastomer. At this time, the web 24 is removed where appropriate and the cut section of the structure is arched to match the curvature of the glass if curved glass windows are to be used. Next, the cut section is bent into the final shape of the lateral and top of the window opening, as shown in FIG. 1. If necessary, a partial V-shaped cut may be formed at each of the corners of the structure corresponding to the corners of the window opening to facilitate bending of the cut section. FIG. 1 shows cut corners 30 and 31 which are then covered with an additional layer of elastomer, which may be in the form of a molded rubber covering. Finally, the licker L is inserted into the U-shaped portion 11 and the structure is ready to be attached to an car door frame. It is noted that the structure is attached as a finished unit to cover the lateral and upper sides of the window opening. The structure is relatively rigid but can be flexed slightly for insertion in the door frame. The rigidity of the structure helps to hold it in place using the gripping action of the U-shaped portion 12 only in spite of road induced vibrations, repeated up and down movement of the window and the like.

The present invention is ideal for use with curved glass windows. Normally these windows present a problem since it is difficult to obtain exact correspondence in curvature between the glass and the door frame. However, according to the present invention, such exact correspondence is not necessary since the flexibility of the sealing and guiding channel compensates for any difference in curvature between these two elements.

The foregoing description is intended to illustrate the present invention but not to limit the scope thereof. Clearly, numerous modifications in the form of substitutions, additions and the like can be made to the invention without departing from the scope thereof as set forth in the appended claims.

What is claimed as the invention is:

1. A structure for guiding and sealing a movable window, comprising:
    a first portion having a core and having means including a U-shaped clamping portion for connection to a frame of an automotive door;
    a second portion having a core, and having means comprising a U-shaped guiding portion which opens oppositely to said U-shaped clamping portion for guiding and sealing a movable window of an automobile, said U-shaped guiding portion having an outer retaining wall connected to a web forming the bight of said U-shaped guiding portion, said outer retaining wall forming the leg of the U-shaped guiding portion farthest from said U-shaped clamping portion, said web having a window sliding portion adjacent said outer retaining wall; and
    an elastomeric connection between said first portion and said second portion to provide limited hinge-like flexing movement between said first and second portions, said outer retaining wall being outside said window sliding portion and said elastomeric connection being inside said window sliding portion intermediate said U-shaped clamping portion and said window sliding portion.

2. A structure according to claim 1 wherein said elastomeric connection comprises an elastomeric material bonded to said first portion and bonded to said second portion.

3. A structure according to claim 2 wherein said first portion further includes a licker member having at least one sealing lip extending toward said second portion.

4. A structure according to claim 3 wherein said first portion includes a further U-shaped portion clamping said licker member in place, said further U-shaped portion being inverted with respect to said U-shaped clamping portion.

5. A structure according to claim 3 wherein said licker has two sealing lips.

6. A structure according to claim 1 further including sealing lips extending away from the first and second portions to seal against said frame.

7. A structure according to claim 1 wherein said rigid core of said first portion and said rigid core of said second portion comprise aluminum.

8. In combination with an apparatus for supporting a movable window for movement along a path in said frame, a structure for guiding and sealing said movable window, comprising:
    a first portion having a core and having a Ushaped clamping portion clamped to said frame;
    a second portion having a core, and having means comprising a U-shaped guiding portion which opens oppositely to said U-shaped clamping portion for guiding and sealing said movable window, said U-shaped guiding portion having an outer retaining wall connected to a web forming the bight of said U-shaped guiding portion, said outer retaining wall forming the leg of the U-shaped guiding portion farthest from said U-shaped clamping portion a portion of said web adjacent said outer wall extending along said movable window path; and
    an elastomeric connection providing limited hinge-like flexing movement between said first and second portions, said outer retaining wall being outside said movable window path and said elastomeric connection being inside said movable window path intermediate said U-shaped clamping portion and said window sliding portion.

9. A method of manufacturing a structure for guiding and sealing movable windows, comprising:
    forming a carrier having at least two U-shaped portions;
    covering said carrier with an elastomeric material; and
    cutting said carrier after said covering of said carrier in order to separate said carrier into sections, one of said section including said first U-shaped portion and the other of said sections including the other of said U-shaped portions, said sections remaining connected by said elastomeric material.

10. A method according to claim 9, wherein said step of forming a carrier comprises forming said carrier such that said two U-shaped portions have side by side walls interconnected by a web, and said step of cutting said carrier comprises removing said web.

11. A method according to claim 9 wherein said step of covering said carrier comprises bonding said elastomeric material to said carrier.

12. A method according to claim 9 wherein said step of forming a carrier comprises forming said carrier from aluminum.

13. A method according to claim 9 wherein said step of covering said carrier includes forming sealing lips of said elastomeric material.

14. A method according to claim 9 wherein the step of forming a carrier includes forming a third U-shaped portion having a wall common with a wall of one of said first mentioned U-shaped portions and opening in a direction opposite to a direction of opening of said one of said first mentioned U-shaped portion.

* * * * *